(No Model.) 3 Sheets—Sheet 1.
J. A. HAMPTON & E. C. SOOY.
BALING PRESS.
No. 345,502. Patented July 13, 1886.
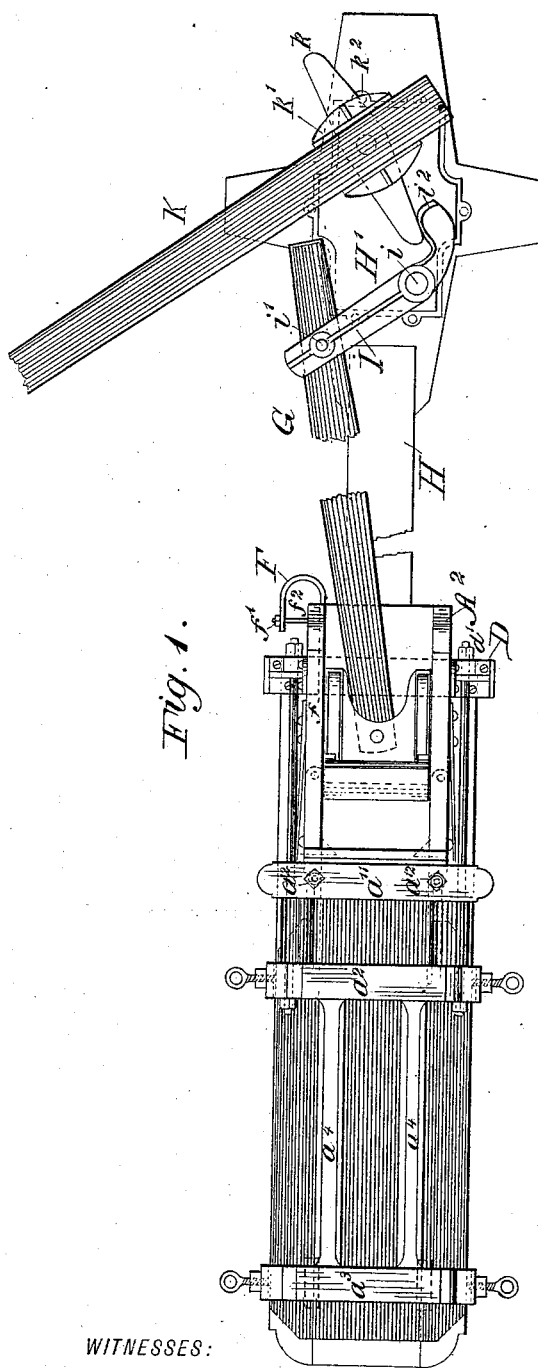
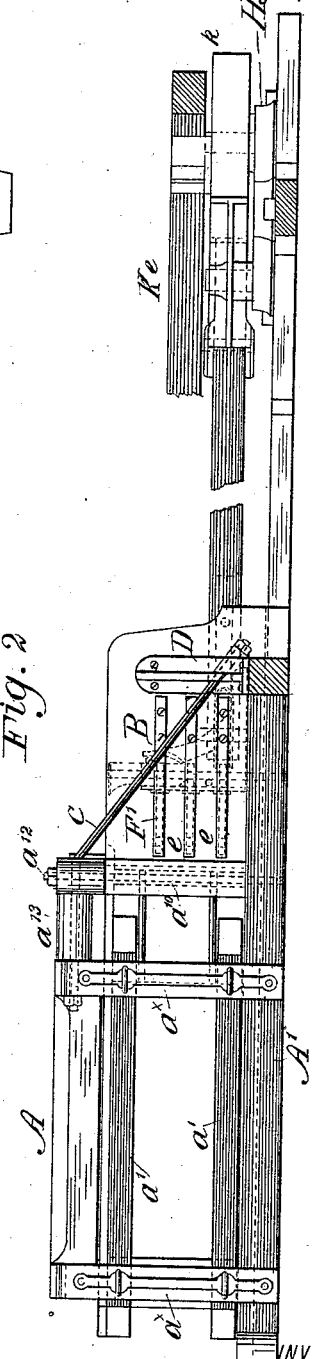
WITNESSES:
N. S. Masson
J. R. Barnett
INVENTORS
John A. Hampton
Ephraim C. Sooy
per Rich'd N. Manning
ATTORNEY

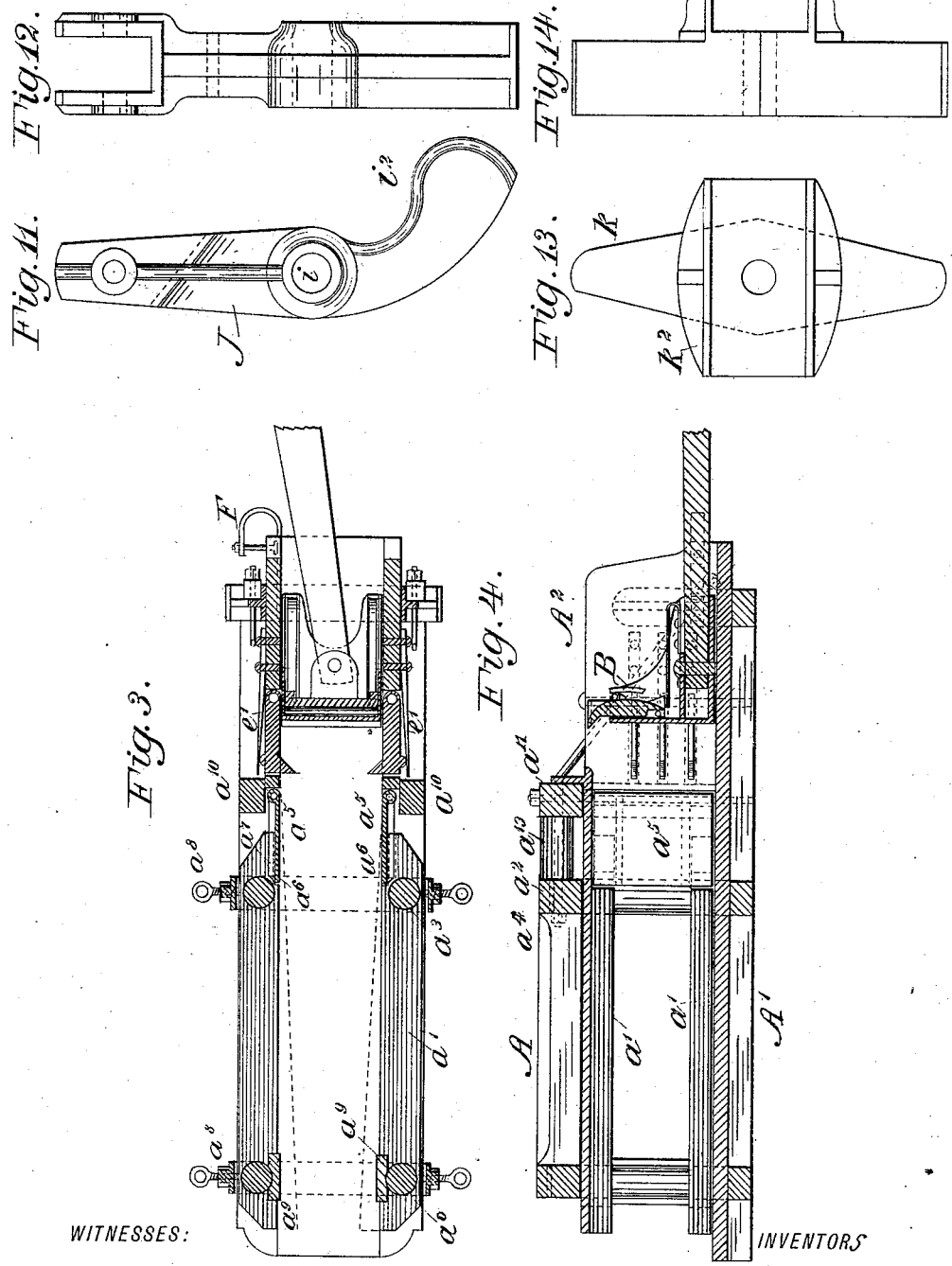

(No Model.) 3 Sheets—Sheet 3.
J. A. HAMPTON & E. C. SOOY.
BALING PRESS.
No. 345,502. Patented July 13, 1886.
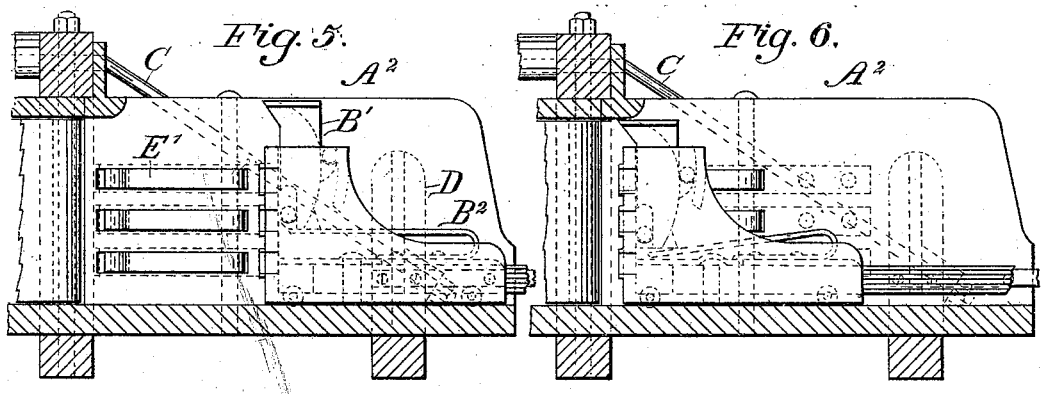
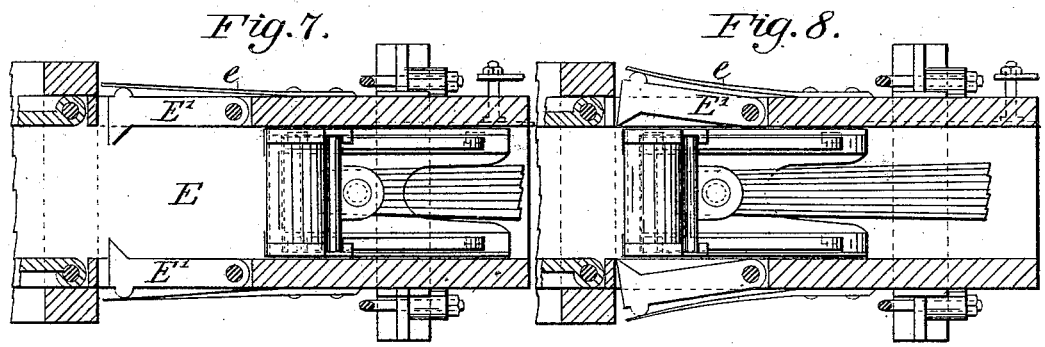
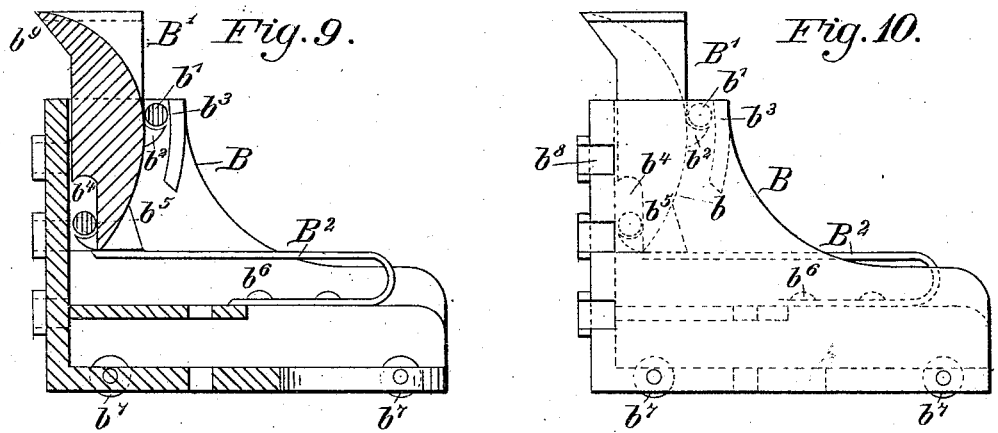
WITNESSES:
N. S. Masson
J. R. Barnett
INVENTORS
John A. Hampton
Ephraim C. Sooy
per Rich'd N. Manning
ATTORNEY

UNITED STATES PATENT OFFICE.

JOHN A. HAMPTON, OF ROSEDALE, KANSAS, AND EPHRAIM C. SOOY, OF KANSAS CITY, MISSOURI.

BALING-PRESS.

SPECIFICATION forming part of Letters Patent No. 345,502, dated July 13, 1886.

Application filed November 23, 1885. Serial No. 183,663. (No model.)

*To all whom it may concern:*

Be it known that we, JOHN ANDREW HAMPTON, of Rosedale, in the county of Wyandotte and State of Kansas, and EPHRAIM C. SOOY, of Kansas City, in the county of Jackson and State of Missouri, have invented certain new and useful Improvements in Baling-Presses; and we do hereby declare that the following is a full, clear, and exact description of the invention, which will enable others skilled in the art to which it appertains to make and use the same, reference being had to the accompanying drawings, forming a part of this specification.

Our invention has for its object certain novel improvements in baling-presses, whereby in the formation of continuous bales the top of the bale may be given a smooth conformation equally with the sides, thus preventing a waste from straggling ends of hay, which results from imperfect baling, and in the chamber of which press the bale may be formed of any desired size and weight; and it consists in the novel combination and arrangement of parts hereinafter fully described, and specifically pointed out in the claims.

In the drawings, Figure 1 is a top plan view of our improved baling-press, and showing means for conveying power to the head-block. Fig. 2 is a side view of the press as seen in Fig. 1. Fig. 3 is a horizontal section of Fig. 2, indicating by section-lines as being cut through the press as shown in Fig. 1. Fig. 4 is a vertical sectional view of the press, as seen in Fig. 2. Fig. 5 is a vertical section through the feed-receptacle, showing the position of the expansive head-block when drawn outwardly to receive the hay. Fig. 6 is a similar view to that shown in Fig. 5, and showing the position of the head-block when forcing the hay within the baling-chamber. Fig. 7 is a sectional view of the feed-receptacle as seen in Fig. 6, showing the position of the retaining devices when the head-block is drawn outwardly; and Fig. 8 is a similar view to that shown in Fig. 7, showing the position of the retaining devices when the head-block is forcing the hay into the baling-chamber. Fig. 9 is a vertical sectional view through the head-block; and Fig. 10 is a side view of the head-block, showing the recess to admit the retaining devices. Fig. 11 is a top view of the guide-lever. Fig. 12 is a side view of the same. Fig. 13 is a plan view of the tripping-lever. Fig. 14 is a side view of the same.

In the construction of our improved baling case or press, A, we form the bottom A' preferably rectangular in form, upon which are the feed-receptacle baling-chamber and delivery portion of the press in communication with each other. To the bottom A' are attached the upright standards $a^\times a^\times$, which are placed in opposite relations upon opposite sides of the press, and at the requisite distance apart in the longitudinal direction of the press. The standards $a^\times a^\times$ are made the proper height for the size of the bale, and are connected together from opposite sides of the press by means of the cross-bars $a^2 a^3$. Extending from the cross-bar $a^2$ to the bar $a^3$ are longitudinal bars $a^4$, which serve to strengthen the case.

Forming the sides of the delivery end of the press are the longitudinal movable side bars $a' a'$, which extend from the baling-chamber to the end of the press, and are attached to vertical bars $a^6 a^6$. The baling-chamber E is formed in a central relation to the case or press between the delivery portion and the feed-receptacle, and standards $a^{10} a^{10}$ are attached to the bottom A', and placed in opposite relation to each other on opposite sides of the press, and the requisite distance from the standards $a^\times a^\times$ for the formation of the bale, and to which standards $a^{10}$ are attached the sides of the feed-receptacle $A^2$. A transverse bar, $a^{11}$, is attached to opposite standards $a^{10} a^{10}$ by means of the bolts $a^{12} a^{12}$, which are attached to the bottom of the press and extend upwardly through the baling-chamber E and through said bar, and near the said standards $a^{10} a^{10}$; and to said bolts, upon opposite sides of the chamber E, are hinged the adjustable sides, $a^5$, of said chamber. The sides $a^5 a^5$ extend in the direction of the delivery portion of the press, and to the ends opposite to that hinged to the rods $a^{12}$ are attached the side bars $a' a'$ of the delivery portion of the press. In attaching the side bars $a'$ to said adjustable sides $a^5 a^5$ the ends of the said bars are grooved at $a^6$ in a vertical relation, and upon the sides $a^5$ are cast the flanges $a^7$, which enter the groove $a^6$, and permit a movable joint to be formed thereby, as well as preventing the displacement of the side bars. The side bars $a'\ a'$ are forced toward each other for the purpose of adjustment, to meet the required size of bale, by means of the set-screws $a^s\ a^s$, which are made to pass transversely through the standards $a^x\ a^x$ and impinge upon the side bars $a'\ a'$. Upon the inner side of the side bars $a^0\ a^0$ are retaining-blocks $a^9\ a^9$, which project a slight distance from the side of said bars and are opposite to each other, and prevent the outward expansion of a bale when tying up the bale.

The feed-receptacle $A^2$ is made with opposite longitudinal sides, which are attached on opposite sides of the press to the standards $a^{10}\ a^{10}$, and also to the bottom $A'$ of the press. To the bottom $A'$ of the press, and bearing against the outer side of the feed-receptacle $A^2$, are bolted the angle-braces D.

The top bars, $a^2$ and $a^{11}$, of the press are connected by the bolts $a^{13}$, extending in the longitudinal direction of the press from one to the opposite bar, and from the top bar $a^{11}$ to the lower portion of the angle-brace D we extend a rod, C, which is securely bolted thereto, thus enabling the standards $a^{10}\ a^{10}$ to resist the strain produced in forcing the hay within the chamber E. The sides of the feed-receptacle $A^2$ are provided with longitudinal transverse slots $e\ e$, and pivoted to the sides of said case, within said slots, and extending through said slots, are the retaining devices $E'$, the spring $e'$, which bears against said devices, serving to keep the said retaining devices projecting within the feed-receptacle at the entrance of the baling-chamber E.

Within the feed-receptacle we place our improved expanding head-block, B. In the construction of this head-block we make said block of the proper width to slide freely within the feed-receptacle, and with a smooth vertical end, which comes in contact with and forces the hay into the baling-chamber. The height of the head-block is slightly less than that of the baling-chamber; and in opposite sides of the head-block, interiorly and from within, we form the vertical slots $b$. We then introduce within the slots $b\ b$, from above, the expanding portion of the head-block or tucker $B'$. The top of the portion $B'$ of the head-block is made horizontal, and from the edge of the said top toward the end of the head-block which is opposite the chamber E the said portion $B'$ is inclined at $b^9$ at an angle, the remaining portion being made vertical, to slide freely in the head-block. The lower front portion of the tucker $B'$ in the head-block is provided with a grooved recess, $b^4$, and in said groove is placed a friction-roller, $b^5$. A grooved recess, $b^2$, is also formed in the side of the head-block in rear of slot $b$, and in rear of the tucker $B'$, and a guide, $b^3$, on the inner side of said head-block in rear of said recess $b^2$, and a friction-roller placed in said recess. A U-shaped spring, $B^2$, is placed in a horizontal relation beneath the lower end of the tucker $B'$, one portion of which spring is riveted to the base of the head-block by the rivet $b^6$, and the upper free end supporting the said tucker adjustably within the slots of the head-block. The head-block B is mounted upon the rollers $b^7\ b^7$, placed beneath said head-block. In the outer side of the head-block are made the grooves $b^8\ b^8$, corresponding to the width and location of the longitudinal transverse slots $e\ e$ in the side of the feed-receptacle, which grooves permit the entrance of the retaining devices $E'$. Extending in the longitudinal direction of the press and a suitable distance from said press, and attached to the bottom $A'$, is a connecting-beam, H, upon which is mounted, near the end and the requisite distance from the press, the plate $H'$. To the plate $H'$, and near one corner of said plate, we pivot the tripping-lever $k$, which has two arms extending in the same longitudinal direction. In a central relation to said arms we form the opposite flanges $k^2$, between which one end of a pole, K, is placed and the power applied at the opposite end of said pole.

In a diagonal relation to the pivot-point of the tripping-lever on the plate $H'$ we pivot a guide-lever, I, one end of which lever is bent nearly at right angles, as at $i^2$, so as to come in contact with one of the arms $k$ of the tripping-lever. A driving-lever, G, is then attached at one end to the head-block, and the opposite end is attached to one end of guide-lever I, and the said guide-lever I is pivoted to the plate $H'$ by means of the pivot $i$.

Upon the inner side of the receptacle $A^2$ we make a longitudinal slot, $f$, and in said slot we pivot one end of a flat spring, F. A bolt, $f^2$, is then fixed rigidly in the outer side of the receptacle $A^2$, and extending laterally therefrom and near the said spring F. The end of the spring F is then bent around the end portion of the side of the feed-receptacle and perforated, so as to pass over said bolt $f^2$. The end of the bolt $f^2$ is screw-threaded, and a nut, $f'$, fitted thereon, and bearing upon the outside of the spring F.

In the operation of our hay-press the pole K is made to turn in a circle by horse or other power. The ends of the arms $k$ are then in their relation brought to bear directly against the end of the driving-lever G, which forces the head-block toward and into the chamber E, the guide-lever I acting to first guide the ends of the arms, so that they may strike exactly upon one end of the driving-lever G, and upon finishing a stroke, should the end of the driving-lever be not thrown outward far enough, one of the arms $k$ of the power in rotation strikes against the portion $i^2$ of the guide-lever, and the head-block is thrown its full distance away from the baling-chamber. The hay is then introduced, and as the head-block is thrown toward the baling-chamber E the tucker $B'$ strikes the upper portion of the baling-chamber, and is carried downwardly and forced within the chamber E, the ends of the hay being taken by the tucker and thrown beneath and forced into the bale. As the head-block is forced against the hay in the baling-chamber, the expansion of the hay, when the tripping-lever is not acting, throws said head-block outwardly. To regulate the backward throw of the head-block, the adjustment of the nut $f'$ on the rod $f^2$ throws the spring F within the feed-receptacle far enough to intercept and limit the distance in which the head-block may recoil.

It is found necessary to check the delivery of the bales as formed in the press and at the extreme end of the press, so as to allow the compact formation of the bale in the baling-chamber, and the hay to press easily until it gets to this point, and when the adjusting-screws are operated to throw the sides of the delivery portion of the press toward each other the blocks $a^9$ retain the bales in the said delivery portion the time desired in which to tie the bale.

The advantage of our improved head-block consists in its offering a smooth end to the bale, thus obviating any liability to choke by an accumulation of ends of hay. As soon as the head-block is withdrawn, it expands by the extension of the tucker. The rotary power-connection with the driving-lever permits a circuit to be made in a horse-power press.

Having fully described our invention, what we now claim as new, and desire to secure by Letters Patent, is—

1. The combination, in a hay-press having laterally-adjustable longitudinal side bars, of retaining-blocks arranged near the delivery end of said press and upon the inner side of said side bars, and projecting therefrom, for the purpose described.

2. In a baling-press provided with a baling-chamber, a reciprocating head-block having a suitable vertical slot therein, and an expanding portion of said head-block in said slot provided with a smooth vertical end, whereby the hay is prevented from clogging in the head-block, as specified.

3. The combination, in a baling-press having a baling-chamber and delivery portion of the press in communication with each other, of adjustable sides to said chamber and adjustable sides to said delivery portion of said press, hinged together, as specified, and an adjusting device at the hinging-point of said sides, as described.

4. The combination, in a head-block provided with a vertical slot therein, of an expanding portion of said head-block arranged in said slot, a spring, and an anti-friction device for said slot, for the purpose specified.

5. The combination, in a head-block provided with a suitable vertical slot therein, of an expanding portion or tucker arranged in said slot having a grooved recess, a spring in said slot adapted to support the said expanding portion adjustably, a guide-case in said head-block and in said slot, and friction-rollers in said guide-case and in said grooved recess, substantially as described.

6. The combination, in a baling-press having a suitable longitudinal extension or base, of a plate pivoted to said extension, a connecting-beam attached to the head-block at one end, a tripping-lever pivotally attached to said plate and adapted to contact with the end of said beam, and a guide-lever attached at one end to and near the opposite end of the said connecting-beam, having the opposite end bent nearly at right angles thereto, for the purpose described.

JOHN A. HAMPTON.
EPHRAIM C. SOOY.

Witnesses:
FRED. W. PERKINS,
W. H. ROGERS.